M. J. FRAMBACH & A. R. CORRINGTON.
TIRE PROTECTOR.
APPLICATION FILED SEPT. 20, 1910.
1,001,518.
Patented Aug. 22, 1911.
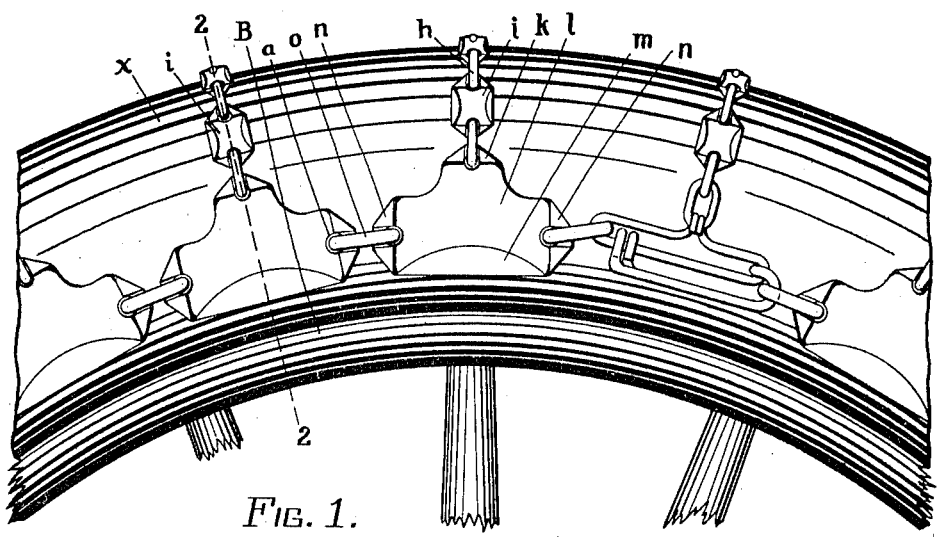
Fig. 1.
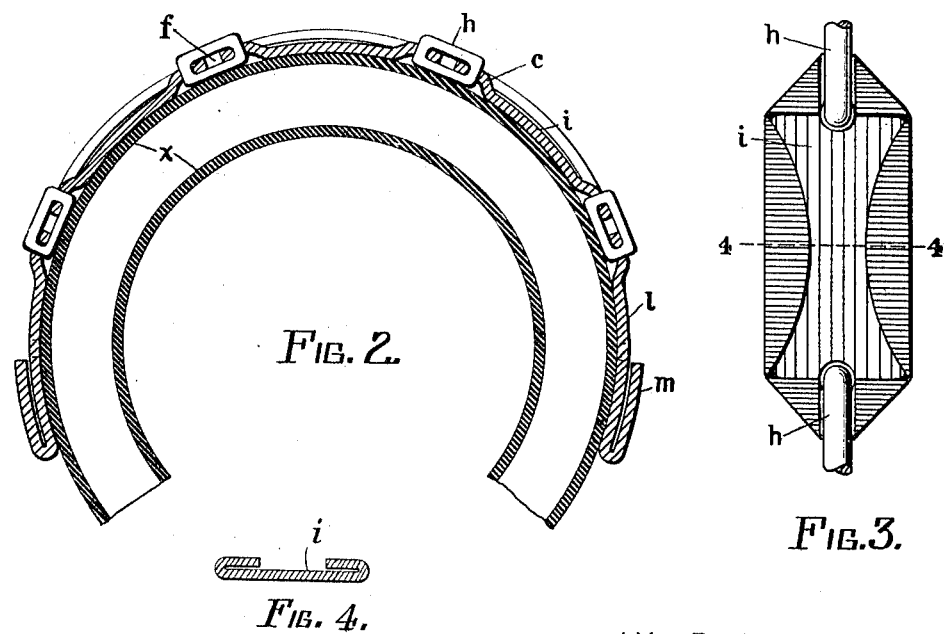
Fig. 2.
Fig. 3.
Fig. 4.
Aldon R. Corrington &
Mathew J. Framback.
Inventors
Witnesses

UNITED STATES PATENT OFFICE.

MATHEW J. FRAMBACH AND ALDON R. CORRINGTON, OF HARTLEY, IOWA, ASSIGNORS OF ONE-HALF TO G. E. KNAACK, OF HARTLEY, IOWA.

TIRE-PROTECTOR.

1,001,518.      Specification of Letters Patent.      Patented Aug. 22, 1911.

Application filed September 20, 1910. Serial No. 582,947.

*To all whom it may concern:*

Be it known that we, MATHEW J. FRAMBACH and ALDON R. CORRINGTON, citizens of the United States, residing at Hartley, in the county of O'Brien and State of Iowa, have invented certain new and useful Improvements in Tire-Protectors, of which the following is a specification.

In the past it has been proposed to protect the tread or center of the tire from wear by incasing the tire in a leathern or other inclosure as an auxiliary tread. Harm has frequently resulted from this method as the tire has a marked tendency to heat through the resultant friction and restriction. A potent objection has been the necessarily costly nature of the materials and manufacture of such casing and which has resulted in making their use expensive and in a great measure unsatisfactory and prohibitive.

Experience and a full knowledge of the conditions have shown that the wear upon a pneumatic tire comes not upon the tread but upon the side; and especially is this true of use upon country roads; and is caused by the continual buffeting and chafing received through contact with the sides of ruts as the tire crushes down into, grinds along through or attempts to leave them and also against the sides of clods, stones, glass, curbs or other obstacles in or along its course.

In view of the need as heretofore pointed out continuous experiment perfected a device of such nature as to overcome the objections heretofore mentioned, and others, while retaining at the same time such simplicity of structure and inexpensiveness of material as to reduce its cost of production to the minimum, obtain the maximum of efficiency and place it well within the reach of the mass of pneumatic and cushion tire users.

A further feature of this invention is the holding together of the two series of shields, guards or buffers installed upon opposite sides of the tire, in such a manner as to allow of no binding on the tire, allowing instead its free action to alter its position upon the tire as it does through the action of the wheel in motion upon the ground. For holding the said series of shields, guards or buffer in place upon the tire side connectors passing over the tread of the tire in such direction as to join the opposite series of shields, guards or buffers are used.

With these and other objects in view the invention comprises certain novel constructions, arrangements, combinations and disposals of parts as will hereinafter be more fully described and claimed.

In the accompanying drawings, Figure 1 is a side elevation of part of a vehicle wheel provided with our invention. Fig. 2 is a section on the line 2—2 of Fig. 1. Fig. 3 is a plan, enlarged, of one of the connecting devices. Fig. 4 is a section on the line 4—4 of Fig. 3.

By referring to the drawings it will be seen that the device consists of a series of guards or shields connected together and located on the side of the tire, the shield being illustrated in Fig. 1 as a plate *l* with lips *n* turned up thereon at opposite ends, a lip *m* at the inner edge, and a lip *k* at the outer end of a projection on the opposite edge. These lips are folded over upon the body of the plate and are for the purpose of adding strength thereto, and for providing rounded edges for presentation to the tire, thus eliminating injury incident to chafing. The wheel rim is indicated at *b* and the tire at *a*, and it will be seen that the protectors are located or extend along opposite sides of the tire affording protection where it is needed. At each end of the plate is a hole *a* to receive the connecting link *o* by which each section is connected to its neighbor. The plates are connected over the tread of the tire by means of a band comprising plates *i* and links *h*. As shown in Figs. 3 and 4 the plates *i* have their edges and ends bent or folded down upon the body of the plate, with holes to receive the connecting links *h* which may be made of wire. The connecting links provide the necessary flexibility for the connections.

The guards or protectors serve to prevent injury to the sides of the tire and also to the rim, by contact therewith of the sides of ruts, stones, curbs or other road obstructions. As shown in Fig. 2, the ends of the plates where the links join are raised slightly as indicated at *e* to enable the links to come flush with the surface of the tire, with the plates in contact with said surface, and the spaces *f* between the ends of the plates permit of necessary play or looseness to accommodate variations in the size of the tire. The folded lips at the edges of the plate afford rounded surfaces that will not injure the tire thereunder, and when placed upon the wheel the protectors form rings consisting of a series of connected plates at opposite sides of the tire.

The main parts of the device may be stamped out of sheet metal or other material, and when stamped out of sheet metal the lips are pressed over to afford the rounded surfaces indicated, and in the movement of the tire incident to its use no injurious effects result, either from the chafing of the tire against the protector or from contact of the tire with curbs or other obstructions, the latter serving to receive wear incident to such contact.

Having thus described our invention, what we claim as new and desire to secure by Letters Patent is:—

1. A tire protector comprising a series of plates, each plate having a lip $m$ at the inner edge thereof, lips $n$ at the end thereof, and a projection provided with lips $k$ at the outer edge thereof, all of said lips being folded inwardly upon the outer face of the plate, said plates also having openings at each end between the lips $n$, links $o$ extending through said holes and connecting the plates, and means to hold said plates on the tire.

2. A tire protector comprising a pair of bands located at opposite sides of the tire, each band consisting of a series of plates, and links connecting the same, each plate having on one side a lateral projection $l$ with lips $k$ at the outer end thereof, and cross connections over the tire from the projections of the plates on one side of the tire to those on the opposite side, each of said connections consisting of a series of plates and links, the plates having lips at opposite ends and the links engaging the plates between said lips.

In testimony whereof, we affix our signatures in presence of two witnesses.

MATHEW J. FRAMBACH.
ALDON R. CORRINGTON.

Witnesses:
WILLIAM GREEMODELT,
HENRY MONSEL.